US005537365A

United States Patent [19]

Sitoh

[11] Patent Number: 5,537,365
[45] Date of Patent: Jul. 16, 1996

[54] APPARATUS AND METHOD FOR EVALUATION OF PICKING HORIZONS IN 3-D SEISMIC DATA

[75] Inventor: Mun K. Sitoh, Houston, Tex.

[73] Assignee: Landmark Graphics Corporation, Houston, Tex.

[21] Appl. No.: 39,641

[22] Filed: Mar. 30, 1993

[51] Int. Cl.$^6$ .................................................. G01V 1/30
[52] U.S. Cl. ............................... 367/73; 367/38; 364/421
[58] Field of Search ................................. 367/38, 68, 71, 367/72, 73; 364/421; 382/17, 18, 39

[56] References Cited

U.S. PATENT DOCUMENTS

| | | | |
|---|---|---|---|
| 5,056,066 | 10/1991 | Howard | 367/72 |
| 5,153,858 | 10/1992 | Hildebrand | 367/72 |
| 5,251,184 | 10/1993 | Hildebrand et al. | 367/72 |

OTHER PUBLICATIONS

Harrigan et al., 53rd EAEG Mtg, Italy; May 26, 1991, Tech Program & Poster Abst. pp. 440–441; abst. and therewith.

*Primary Examiner*—Nelson Moskowitz
*Attorney, Agent, or Firm*—Bush, Moseley, Riddle & Jackson

[57] ABSTRACT

Apparatus and method are disclosed for use with a horizon picking method for 3D seismic data. Variables such as picking method, whether simple or iterative, score required of an iterative method and ΔT between target wavelets and seed wavelet are input into the computer. During the picking process, parameters as to the number of successful picks and the number of failed picks because of the method of picking and because of failed picks due to the score not being achieved in the iterative method and because of failed picks due to the difference in time between the target wavelet and the seed wavelet being greater than the ΔT variable are recorded. Parameters as to successful picking percentage of all target traces attempted to be picked and failure percentages are displayed simultaneously with the picked horizon and the input picking parameters.

7 Claims, 4 Drawing Sheets

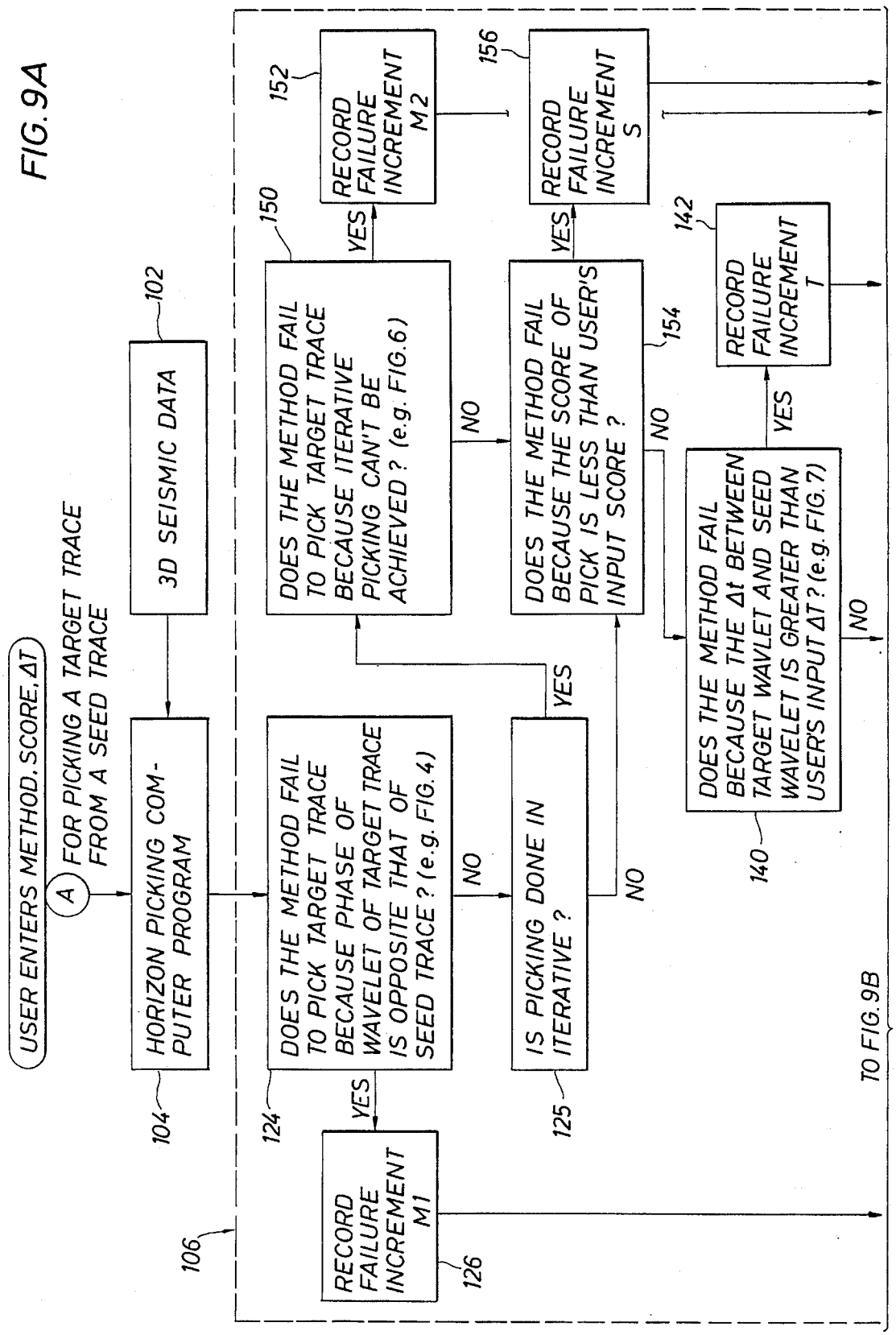

APPARATUS AND METHOD FOR EVALUATION OF PICKING HORIZONS IN 3-D SEISMIC DATA

BACKGROUND OF THE INVENTION

1. Field of Invention

This invention relates generally to the field of seismic data interpretation. In particular the invention relates to a machine process for selection of three-dimensional (3D) seismic data to provide petroleum exploration professionals more detailed understanding of subsurface geology and geometry. Still more particularly, this invention relates to apparatus and a method by which an explorationist may evaluate the performance of an automated method of "picking" or "tracking" individual seismic events through a three-dimensional volume of data.

2. Description of the Prior Art

FIGS. 1 through 6 of the drawings illustrate features and methods associated with the prior art picking methods; FIGS. 7 through 10 illustrate features and methods of the invention. Only figures associated with prior art methods are introduced here.

FIG. 1 illustrates a portion of a hypothetical 3D seismic data volume in order to explain the three-dimensional relationships discussed in the text and accompanying drawings in this specification;

FIG. 2 is an isometric view of a portion of five seismic traces which illustrates the relationship between a "seed point" and its four adjacent "target" traces;

FIG. 3 illustrates a prior art "simple" or non-iterative automatic tracking method;

FIG. 4 illustrates an example of how a "simple" picking mode or method may fail to pick a target trace;

FIG. 5 illustrates a prior art "iterative" autotracking method.

FIG. 6 illustrates an example of how an "iterative" picking mode or method may fail to pick a target trace.

FIG. 1 is an isometric view of a portion of a hypothetical three-dimensional (3D) seismic data volume. The circles at the top of the volume represent the surface location of individual traces. The vertical lines represent seismic traces which are measured in time or distance along the z-axis of the volume. Each individual trace is an amplitude versus time representation of an acoustic reflection from strata in the earth. A sequence of x versus time traces is called a "line" by seismic explorationists. A sequence of y versus time traces is called a "cross-line". Of course, the y versus time traces may be designated a "line" and the x versus time traces called a "cross-line".

In the seismic art vocabulary, a horizontal section or time slice is a horizontal slice or plane through the 3D volume of data. A "horizon slice" is a slice along or parallel to a structurally interpreted horizon and hence along one bedding plane. Plotting of common amplitudes on x-y axes is similar to a surface topographic map, but of course such a plot is of subsurface strata. Plotting of such different amplitudes at a common subsurface depth illustrates different strata at common depths.

In less than ten years, computer aided exploration revolutionized seismic exploration and field development. Until recently, however, one aspect of seismic interpretation-picking subsurface horizons, or simply, "picking", remained essentially unchanged from paper and pencil method to automatic computer picking methods. A horizon is a surface along a bedding plane of a subsurface formation.

Traditionally, picking was done manually by drawing with colored pencils on paper, one seismic section or line at a time, an incredibly tedious process. In the early 1980's interactive CAEX (an acronym for Computer Aided Exploration) workstations gave seismic explorationists the ability to pick 3D data more quickly and effectively. While interpreting seismic lines (that is, a two-dimensional vertical slice or a "vertical seismic section") was still accomplished by viewing and picking one line at a time, it could then be done by using a mouse in combination with a display screen and clicking the cursor on a few selected points along a horizon and letting the machine pick all the rest of the points on that line. This was the first type of automated picking, and represented an incremental increase in both productivity and accuracy over manual picking.

A horizon is typically displayed on a CRT screen of a workstation, that is, a computer. The display is usually an x-y display including a seed point or points and the "picked" points through the 3D seismic data. The difference in depth or time of the target points from the seed point is indicated, for example, by the color of the picked point.

In one prior art automatic system for tracking a bedding plane or horizon in a generally horizontal zone of 3D data, a user selected or "input" at least one "seed point", which then "expanded" in all four directions within the 3D data volume as illustrated in FIG. 2 until it reached the boundaries of a user specified zone. Users had the option of tracking seismic data in one of two modes: simple (non-iterative) or iterative.

A "seed point" is specified by its x and y location and its time of depth (i.e., the z-axis of FIG. 1). It is also specified by a characteristic of the reflection wavelet at that point. Such characteristic is usually the maximum amplitude of the reflection wavelet at that location in the volume of the data. Other characteristics, such as minimum amplitude, phase, frequency, etc., of the reflection at the x,y,z point may be used. As illustrated in FIG. 3 a first mode is for non-iterative tracking which searches the seismic traces adjacent seed points for similar amplitude values, pick the best one, and then proceeds to the next available trace without double-checking the accuracy of the pick.

FIG. 4 illustrates an example as to how an adjacent wavelet may not be picked in the non-iterative mode. If a negative amplitude is sensed on an adjacent trace at the same time or depth, then such target trace is not selected, that is, it is dead.

A second or an iterative picking mode verifies an adjacent trace as a pick by cross-referencing the previous trace. Once verified, the adjacent trace is treated as a seed point and the picking of adjacent traces from it proceeds. FIG. 5 illustrates such prior art iterative picking. Verification means that if the amplitude of the picked trace is within the limits of tolerance set by the user, the pick is accepted. Users can specify (on a scale of 1–10) the degree of amplitude similarity they are willing to allow. If a pick does not pass this acceptance test, it is designated "dead" until at least one directly adjacent trace matches sufficiently to accept it.

More specifically, once a seed point is selected on a trace, the trace is scanned up and down the z or time axis to find the local extrema amplitude or simply "extrema". A local extremum of a variable $x_i$ where is a digitizing index, is defined as $$X_{i-1} < X_i \geq X_{i+1}, \text{ or}$$

$X_{i-1} \times X_i \leq X_{i+1}$.

Such scanning is bounded by zero crossings of the amplitude of the trace in the case of a peak or a trough. Such extrema will typically vary with time a small amount. For example, if $T_0$ represents the seed point, $T_1$ would typically represent the time of the extrema. Next, the time $T_0$ is started on the target trace. On it, the time is varied up and down between zero crossings of its trace amplitude until the nearest extrema $T_2$ is found. Finally, the time $T_2$ is used on the trace on which the seed point exists and on such "seed" trace scanning up and down the "z" axis is again performed for the nearest extrema $T_3$. If $T_3$ equals $T_1$, then iterative tracking has been achieved and tracking continues.

FIG. 6 illustrates an example as to how an adjacent wavelet may not be picked in the iterative mode. Notice that the time $T_3$ is beyond the zero crossing window of the seed point $T_0$. Thus, the target trace is not picked.

The amplitude acceptance test tolerance of the prior art iterative tracking mode defines a function, $$S = \left| \frac{A_1 - A_2}{A_1 + A_2} \right|$$

$A_2$ = Amplitude of the target wavelet of the target trace at $T_2$, and $A_1$ = Amplitude of the seed wavelet from the seed trace at $T_1$.

The value of S is bounded by values of 0 and 1. The more similar the two amplitudes, the closer the S function is to zero. The more dissimilar the two amplitudes, the closer the S function is to 1. Next, a score function is evaluated:

SCORE = (S × 9.0)+1.

The score is compared with a control value from 1 to 10 selected by the interpreter or user of the data. Scores greater than the control value prevent a target trace from being picked.

After the tracking proceeds with each selected target trace becoming a seed trace for selecting more target traces, a "horizon" has been picked. The x, y and t (or z) coordinates of each selected wavelet are stored in the computer memory. A horizon is typically displayed on a CRT screen of a work station (a powerful computer adapted for specialized uses such as seismic data interpretation, CAD/CAM work etc.). The display is usually an x-y display of the seed point (or points) and all the picked points which correspond to the seed point of the 3D seismic data. The variation in depth (that is, time) from the seed point is indicated, for example, by the color of the picked point.

The prior art of horizon picking apparatus and method has provided no means by which a user of such apparatus and methods (that is an explorationist such as a geophysist) may determine how many of the non picked points were due to the particular method of picking (e.g. as illustrated in FIGS. 4 or 6) or due to the failure of the apparatus and method to select a target trace in the iterative mode.

IDENTIFICATION OF THE OBJECTS OF THE INVENTION

A primary object of the invention is to provide a method and apparatus by which a user may determine, after a horizon has been picked and displayed on a CRT screen, what percentage of the unpicked points as compared to the picked points were due to a failure of the method (that is, either the non-iterative mode or the iterative mode).

Another object of the invention is to provide a method and apparatus by which a user may determine what percentage of the un-picked points as compared to the picked points in the iterative mode were due to a failure of a target point to achieve a user selected score.

Another object of the invention is to provide a method and apparatus for another failure mode in horizon picking such that if the time difference between a selected trace from a seed trace is greater that a user specified quantity, then such target wavelet is not selected and further to provide a method and apparatus by which a user may determine what percentage of the un-picked points as compared to the picked points were due to such time difference failure.

SUMMARY

The objects of the invention as identified above, as well as other advantages and features of the invention are realized in an apparatus and method including a computer program used in conjunction with a horizon picking computer apparatus. Such program enables a user to specify whether picking of 3D seismic data is to be done in a non-iterative or an iterative mode. If picking is done in an iterative mode, apparatus and method are provided so that the user is also able to specify what score will be used for a wavelet on a target trace to be picked. The apparatus and method of the invention records the total number of non-picked target traces due to a score failure and displays an indicator of the percentage of score failures to picked points.

Finally, apparatus and method are provided so that a user can specify a difference in time, called $\Delta t$, between the time of the picked trace and the time of the seed trace such that if a user supplied level of $\Delta t$ is exceeded in a pick, the target trace is not picked. The apparatus and method records the number of $\Delta t$ failures of target traces and displays an indicator of the percentage of $\Delta t$ failures to picked points.

A user of the automatic horizon picking apparatus is then enabled to determine the effect of changes in method, score and $\Delta t$ in the picking of any particular horizon.

Such user is enabled to change such method, score and $\Delta t$ parameter to achieve different horizon picking results.

BRIEF DESCRIPTION OF THE DRAWINGS

The objects, advantages and features of the invention will become more apparent by reference to the drawings which are appended hereto and wherein like numerals indicate like elements and wherein an illustrative embodiment of the invention is shown, of which:

FIGS. 9A and 9B comprise a flow diagram representation of the picking characteristics computer program according to the invention.

DESCRIPTION OF THE INVENTION

Figure 6:
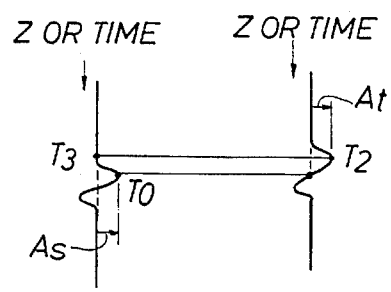
Figure 7:
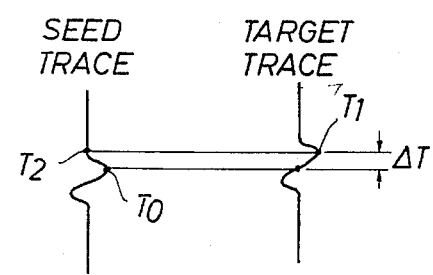
FIG. 7 is a schematic illustration of a failure mode for picking in either the iterative mode or simple non-iterative mode where the target wavelet is more than a predetermined difference in time for the seed wavelet.

FIG. 7 illustrates a further horizon picking failure mode of this invention in addition to the method failure mode discussed above with respect to FIGS. 4 and 6 and further in addition to the score failure mode discussed above. The $\Delta t$ failure mode specifies that an attempted pick is a failure if the difference in time from the time of the picked wavelet to the time of the seed wavelet is greater than a predetermined input $\Delta t$. Times of wavelets are usually measured at their maximum amplitude. FIG. 7 illustrates that in the iterative mode, a target wavelet may satisfy the method picking test (i.e., iterative tracking is proper) and the score test (depending on the user's input of a reference score), but if the $\Delta T$ measured between the time of the target wavelet and the seed wavelet is greater than an input reference $\Delta T$, the pick fails.

Figure 4:
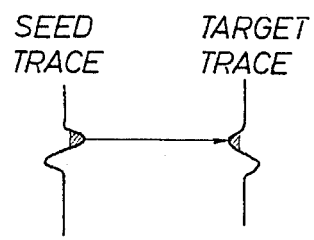
Figure 8:
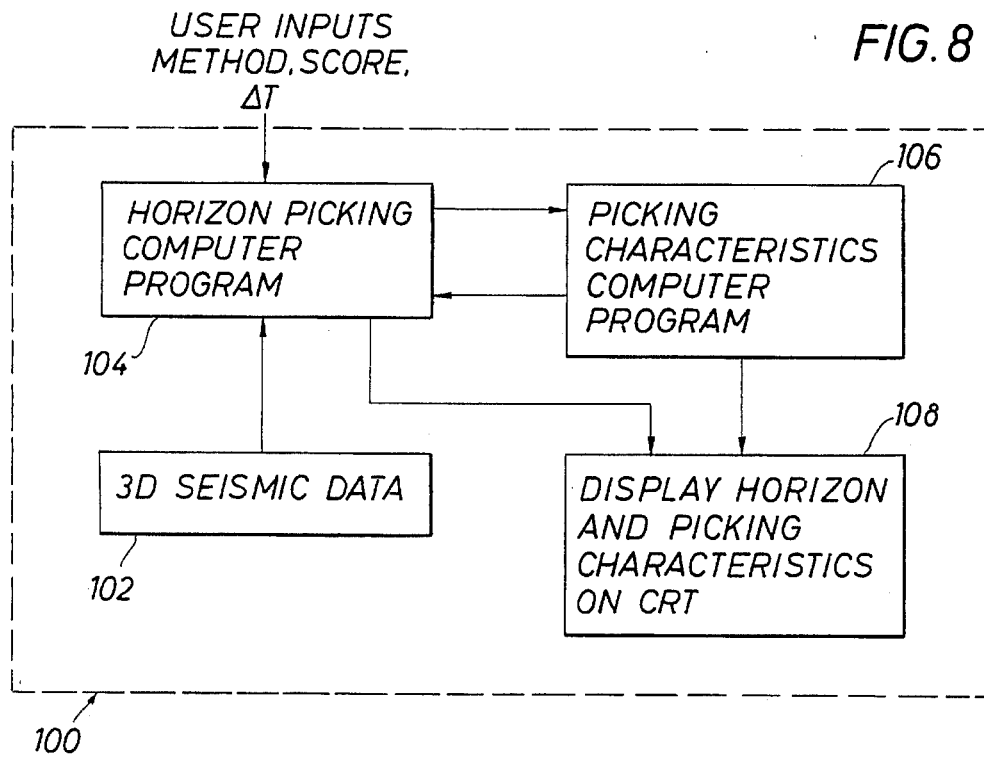
FIG. 8 is a schematic of a computer workstation for picking horizons from 3D seismic data and which includes a picking characteristics computer program according to the invention for displaying such characteristics on a CRT screen.

FIG. 8 schematically illustrates a computer 100 having a memory 102 loaded with a 3D Seismic Data base. The computer 100 includes a horizon picking computer program 104 as described in the Background of the Invention Section of this specification above and as augmented with computer program 106 which determines not only prior art picking failure modes of picking method as illustrated in FIGS. 4 and 6 but also the new $\Delta T$ failure mode illustrated in FIG. 7. The program 106 records the number of failures in the three modes above; as a function of user supplied information as to method (simple, or iterative), picking score and $\Delta T$. The program also determines the percentages of the number of picking successes to the number of picking successes, the percentage of failures due to method failures, the percentage of failures due to a score failure and the percentage of failures due to a $\Delta T$ failure as described above. A display 108 is generated such that preferably the picked horizon is displayed on a CRT monitor 110 (see FIG. 10) along with displays as to the input variables, method, score and $\Delta t$ and the percentages of picking successes and failures as described above.

Figure 1:
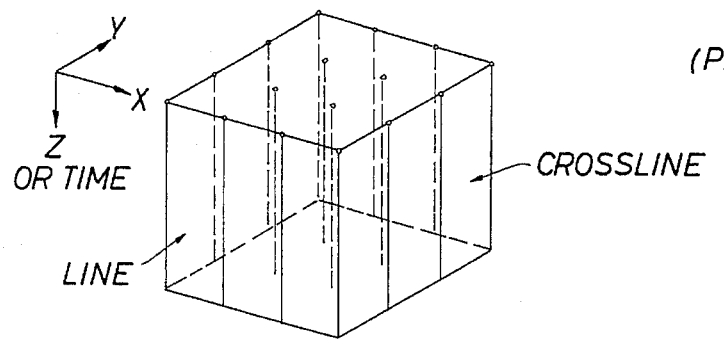
FIGS. 1–6 were described in the BACKGROUND Section above.
Figure 2:
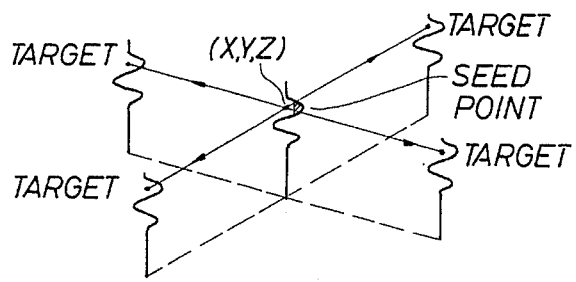
Figure 3:
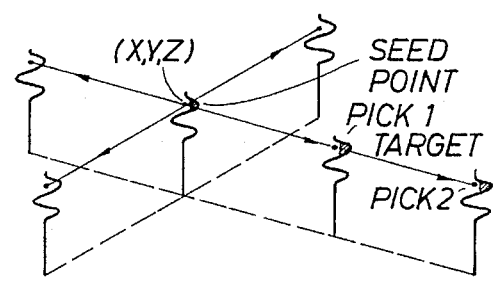
Figure 5:
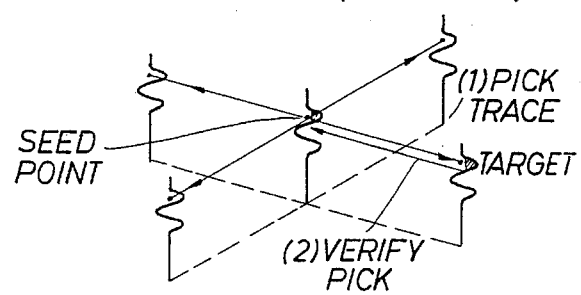
Figure 9B:
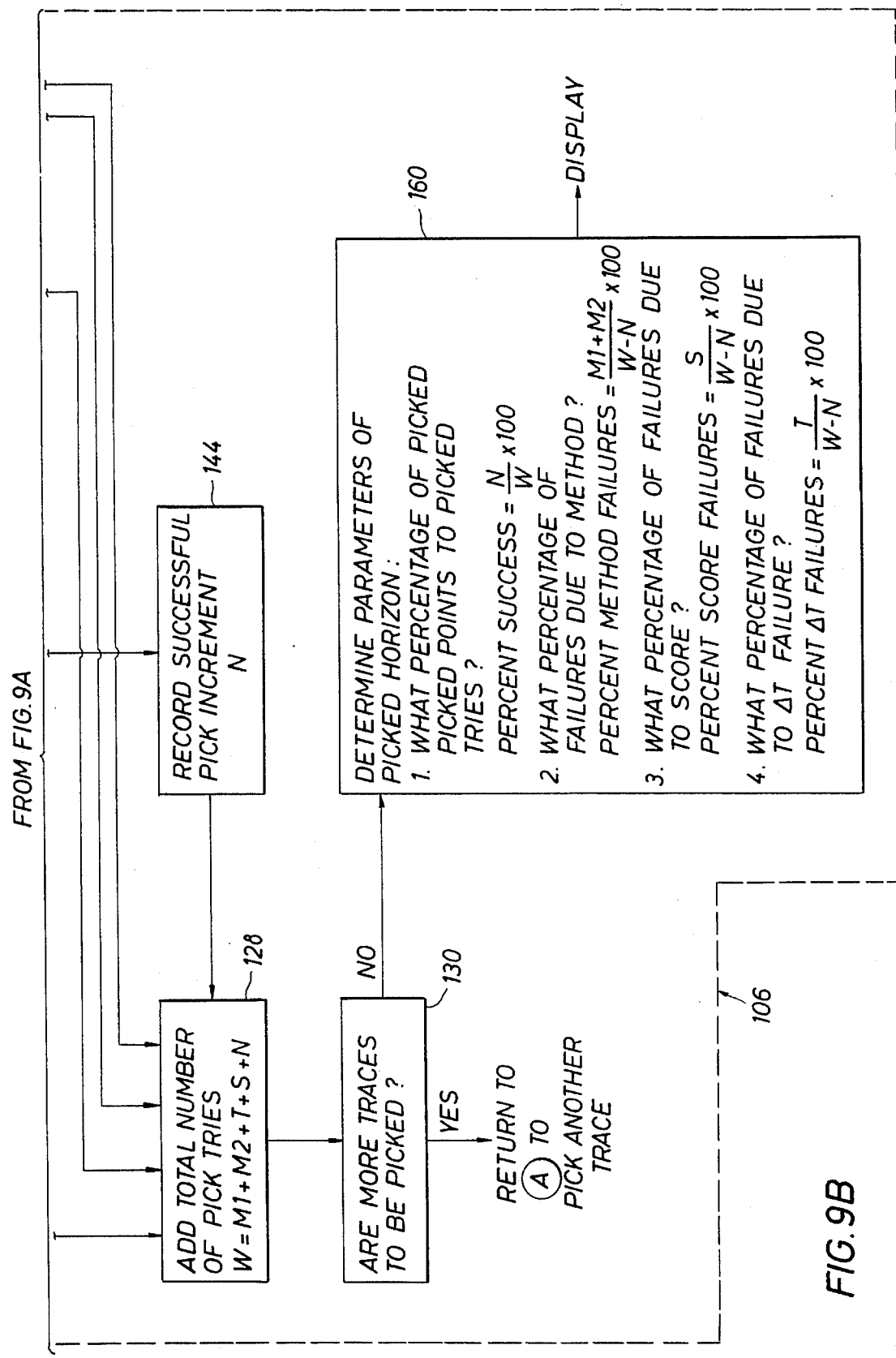

FIGS. 9A and 9B present a flow chart of the picking characteristics computer program 106. The user enters method data, either simple (non-iterative) or iterative, to indicate to program 104 how picking is to proceed as illustrated generally in FIGS. 3 and 5. A score value and a $\Delta T$ value are also input by the user. The particular picking program selected, as indicated by program 104, accesses 3D Seismic Data from memory 102 and attempts to pick a target wavelet from a seed wavelet. For each pick, program 106 determines whether the pick was successful, and if not, the failure mode. Over and over again picking proceeds where a successfully picked target wavelet becomes the seed wavelet for the next target wavelets.

Logic box 124 determines if the pick failed due to a "method"/failure, i.e., as in FIG. 4, the wavelet of the target trace has an amplitude 180° out of phase the seed wavelet. If there is a failure on that account, a variable M1 is incremented in logic box 126 and passed along to logic box 128 to determine the total number of picking tries and then to logic box 130 to determine if more picking is done. If more picking is to be performed, control is passed again to program 104 for the next pick.

If the method of logic box 124 does not fail due to a difference in phase of the target trace and the seed trace, control is passed to logic box 125.

If picking is in the iterative mode, control passes from logic box 125 to logic box 150 where a determination is made as to whether or not iterative tracking was successful. If there is a failure due to the iterative mode not being successful (e.g. the example of FIG. 6), then control passes to logic box 152 which increments a variable M2 indicative of the number of iterative picking method failures. Control is then passed to logic box 128 and logic box 130 for another pick if picking has not been completed.

If the picking is successful, control passes from logic box 150 to logic box 154 for a determination of whether or not the iterative pick resulted in a score less than the user input score. Control is also passed to logic box 154 from a no answer from logic box 125. If there is a failure of the score test, control is passed to logic box 156 where a variable S is incremented and then to logic box 128 and logic box 130 and to the beginning of the program for more picking if not complete.

If the iterative score test for a pick is successful, control passes to logic box 140 where the $\Delta T$ failure mode is determined as discussed above and illustrated in FIG. 7. The logic box 140 uses the user supplied $\Delta T$ value in its determination. If the pick fails because of the $\Delta T$ test, control is passed to logic box 142 where a variable T is incremented so as to record the number of pick failures due to the $\Delta T$ test. Control then passes to logic box 128 for a determination of the total number of pick tries and then to logic box 130 for a return for more picking if picking is not complete. If the logic box 140 produces a No result, i.e. picking is successful, control is passed to logic box 144 for incrementing a variable N indicating successful picks. Control then passes to logic boxes 128 and 130 and picking begins again.

After picking through the 3D Seismic Data is complete, logic box 144 includes a number, N, representative of the total number of successful picks through the data. Logic box 128 includes a number representation, W, of the total number of target traces. Logic box 126 includes a number M1 representative of the total number of simple method failures; logic box 152 includes a number M2 representative of the total number of iterative method failures; logic box 156 includes a number S representative of the total number of score failures; and logic box 142 includes a number T representative of the total number of $\Delta t$ failures.

Control is then passed to logic box 160 which determines (1) the percentage of picked points to pick tries, i.e.

$$\text{percent success} = \frac{N}{W} \times 100;$$

(2) the percentage of failures due to method, i.e.

$$\frac{M_1 + M_2}{W - N} \times 100$$

(note that only one variable $M_1$ or $M_2$ will be non zero, i.e. only one method is used at a time; (3) the percentage of failures due to score, i.e.

$$\frac{S}{W - N} \times 100;$$

and (4) the percentage of failures due to $\Delta t$, i.e.

$$\frac{T}{W - N} \times 100.$$

Figure 10:
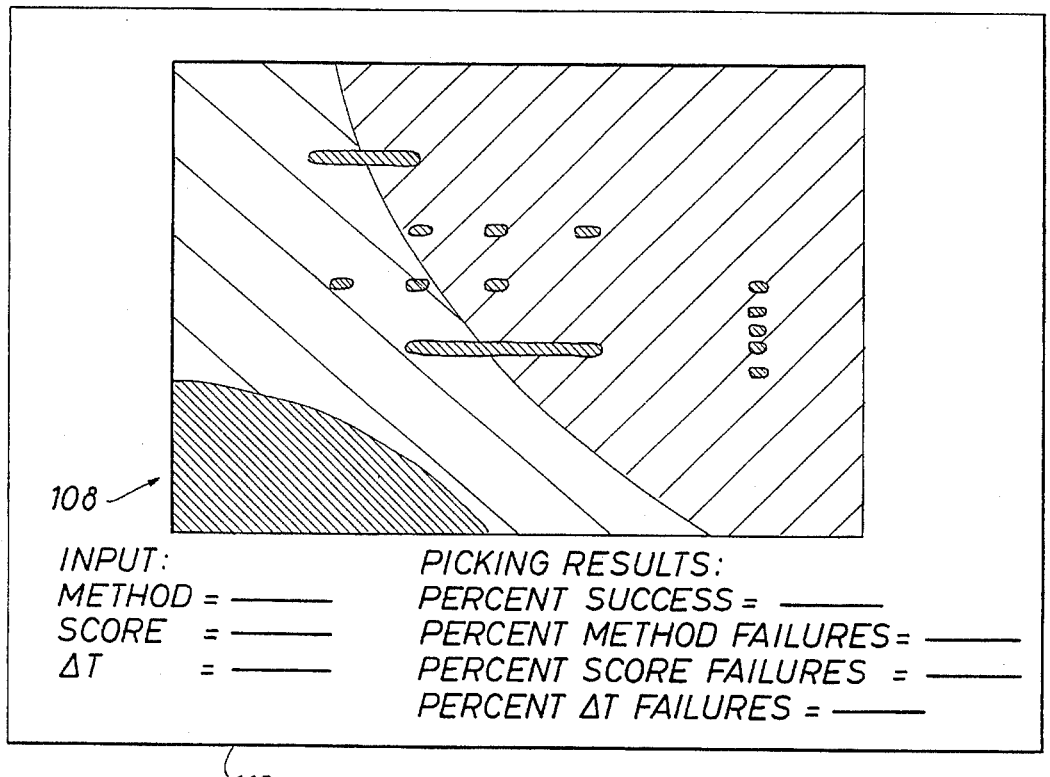
FIG. 10 is an illustration of a CRT screen which displays a horizon which has been picked with the picking computer program of FIG. 9 and which further illustrates the display of picking characteristics of the displayed horizon.

FIG. 10 illustrates a CRT screen 110 with the results of the picking displayed as a horizon 108. The horizon includes shaded regions (actual displays use colors rather than shading) which indicate successful picks with variations in shading indicating the depth or time of the horizon. The black regions indicate failures of the picking process.

At the bottom of the screen (or some other convenient place on it for example in a "pop-up" display) information as to the user input as to method, score and ΔT variables is displayed so that the user may have a visual indication of the parameters of the pick. After the horizon has been picked, the picking results as described above are also displayed on the screen.

The advantage of the display, possible because of the program described by way of flow chart of FIG. 9, is that the user is provided with a quantitative indication of the effect of changing the variables method, score and ΔT.

If a large number of picks are not made, such result may be because of the method used, or a high score or a low ΔT required for successful picking. With the invention described above, the user may change the user inputs, view the horizon produced and refer to the displayed failure statistics. He can then change the input variables and see what changes are produced in the displayed horizon and assess the characteristics of the 3D seismic data as a result of picking and the quantative display as to the picking failures.

Various modifications and alterations in the described methods and apparatus will be apparent to those skilled in the art of the foregoing description which does not depart from the spirit of the invention. For this reason, these changes are desired to be included in the appended claims. The appended claims recite the only limitation to the present invention. The descriptive manner which is employed for setting forth the embodiments should be interpreted as illustrative but not limitative.

What is claimed is:

1. A method of automatically selecting a horizon of earth formations from a three dimensional volume of seismic wavelet traces comprising the steps of a) designating a time interval reference $\Delta T_{ref}$, b) designating a seed point at a time $T_0$ of a seed wavelet of one of said seismic traces, said one seismic trace being designated a seed trace, said time $T_0$ corresponding to the time of an attribute of said seed wavelet, where said attribute lies on said horizon to be selected, c) transferring said time $T_0$ to a target trace of said three dimensional volume of seismic wavelet traces, d) on said target trace, starting from said time $T_0$ to find a time $T_1$ of an attribute of a target trace wavelet which corresponds to said attribute of said seed wavelet trace, e) deleting said target trace from further automatic picking if the time difference between $T_1$ and $T_0$ exceeds said time interval reference $\Delta T_{ref}$, and f) accepting said target trace for further automatic picking steps if the time difference between $T_1$ and $T_0$ is less than said time interval reference $\Delta T_{ref}$, recording the number of occurrences that a target trace is deleted in said automatic picking steps (b), (c), (d) and (e) where a trace is deleted due to a time difference between a target wavelet and a seed wavelet being less than said time interval reference $\Delta T_{ref}$, and displaying on a CRT screen a characteristic of said number of occurrences.

2. A method of automatically selecting a horizon of earth formations from a three dimensional volume of seismic wavelet traces comprising the steps of a) designating a time interval reference $\Delta T_{ref}$, b) designating a seed point at a time $T_0$ of a seed wavelet of one of said seismic traces, said one seismic trace being designated a seed trace, said time $T_0$ corresponding to the time of an attribute of said seed wavelet, where said attribute lies on said horizon to be selected, c) transferring said time $T_0$ to a target trace of said three dimensional volume of seismic wavelet traces, d) on said target trace, starting from said time $T_0$ to find a time $T_1$ of an attribute of a target trace wavelet which corresponds to said attribute of said seed wavelet trace, e) deleting said target trace from further automatic picking if the time difference between $T_1$ and $T_0$ exceeds said time interval reference and f) accepting said target trace for further automatic picking steps if the time difference between $T_1$ and $T_0$ is less than said time interval reference $\Delta T_{ref}$, designating a reference score required for interactive automatic picking, and said automatic picking steps including interactive tracking steps which pick a target trace if an interactive tracking score for a target trace is greater than said reference score, but deletes a target trace for score failure if an interactive tracking score for a target trace is less than said reference score.

3. The method of claim 2 further comprising the steps of recording the number of occurrences that a target trace is deleted due to score failure in said interactive tracking steps, and displaying on a CRT screen a characteristic of said number of times in said automatic picking steps that a target trace is deleted due to score failure.

4. A method of automatically selecting a horizon of earth formations from a three dimensional volume of seismic wavelet traces comprising the steps of a) designating a time interval reference $\Delta T_{ref}$, b) designating a seed point at a time $T_0$ of a seed wavelet of one of said seismic traces, said one seismic trace being designated a seed trace, said time $T_0$ corresponding to the time of an attribute of said seed wavelets where said attribute lies on said horizon to be selected, c) transferring said time $T_0$ to a target trace of said three dimensional volume of seismic wavelet traces, d) on said target trace, starting from said time $T_0$ to find a time $T_1$ of an attribute of a target trace wavelet which corresponds to said attribute of said seed wavelet trace, e) deleting said target trace from further automatic picking if the time difference between and $T_0$ exceeds said time interval reference $\Delta T_{ref}$, and f) accepting said target trace for further automatic picking steps if the time difference between $T_1$ and $T_0$ is less than said time interval reference $\Delta T_{ref}$, deleting said target trace from further automatic picking steps for method failure if the phase of said attribute of said target trace wavelet is opposite that of said attribute of said seed wavelet, recording the number of occurrences as method failure that a target trace is deleted because the phase of said target trace wavelet attribute is opposite that of said attribute of said seed wavelet, and displaying on a CRT screen a characteristic of said method failures in said automatic picking steps that a target trace is deleted due to method failure.

5. A method of automatically selecting a horizon of earth formations from a three dimensional volume of seismic wavelet traces comprising the steps of a) designating a time interval reference $\Delta T_{ref}$, b) designating a seed point at a time $T_0$ of a seed wavelet of one of said seismic traces, said one seismic trace being designated a seed trace, said time $T_0$ corresponding to the time of an attribute of said seed wavelet, where said attribute lies on said horizon to be selected, c) transferring said time $T_0$ to a target trace of said three dimensional volume of seismic wavelet traces, d) on said target trace, starting from said time $T_0$ to find a time $T_1$ of an attribute of a target trace wavelet which corresponds to said attribute of said seed wavelet trace, deleting said target trace from further automatic picking if the time difference between $T_1$ and $T_0$ exceeds said time interval reference $\Delta T_{ref}$, and accepting said target trace for further automatic picking steps if the time difference between $T_1$ and $T_0$ is less than said time interval reference $\Delta T_{ref}$, recording the number of successful target traces that are picked, recording the number of occurrences that a target trace is deleted in said automatic picking steps (b), (c), (d) and (e) where a trace is deleted due to a time difference between a target wavelet and a seed wavelet being less than said time interval reference $\Delta T_{ref}$, designating a reference score required for interactive automatic picking, said automatic picking steps including interactive tracking steps which pick a target trace if an interactive tracking score for a target trace is greater than said reference score, but deletes a target trace for score failure if an interactive tracking score for a target trace is less than said reference score, recording the number of occurrences that a target trace is deleted due to score failure in said interactive tracking steps, deleting said target trace from further automatic picking steps for method failure if the phase of said attribute of said target trace wavelet is opposite that of said attribute of said seed wavelet, and recording the number of occurrences as method failure that a target trace is deleted because the phase of said target trace wavelet attribute is opposite that of said attribute of said seed wavelet.

6. The method of claim 5 further comprising the steps of displaying on a CRT screen said horizon produced in said method of automatically picking said horizon, and simultaneously displaying on said CRT screen input variables as to the method of picking the score required of iterative picking and a characteristic of the number of picked target traces as a function of the total number of picking tries.

7. The method of claim 6 further comprising the steps of displaying on said CRT screen a characteristic of the number of score failures during said picking, the number of method failures during picking, and the number failures during picking.

\* \* \* \* \*